United States Patent [19]

Kahn

[11] E Patent Number: Re. 33,381

[45] Reissued Date of Patent: Oct. 9, 1990

[54] MULTIPLE SYSTEM AM STEREO RECEIVER AND PILOT SIGNAL DETECTOR

[76] Inventor: Leonard R. Kahn, 137 E. 36th St., New York, N.Y. 10016

[21] Appl. No.: 819,162

[22] Filed: Jan. 15, 1986

Related U.S. Patent Documents

Reissue of:

[64] Patent No.: 4,426,728
Issued: Jan. 17, 1984
Appl. No.: 298,230
Filed: Aug. 31, 1981

[51] Int. Cl.[5] ..... H04H 5/00

[52] U.S. Cl. ..... 381/15; 307/524; 328/138

[58] Field of Search ..... 381/1, 13, 15, 2, 16, 381/3, 4; 307/524; 328/138

[56] References Cited

U.S. PATENT DOCUMENTS

| | | | |
|---|---|---|---|
| 2,521,752 | 9/1950 | Schwarz | 455/277 X |
| 3,555,435 | 1/1971 | Vosteen | 307/524 X |
| 3,949,401 | 4/1976 | Hegeler et al. | 455/227 X |
| 4,072,931 | 2/1978 | Davis | 307/524 X |
| 4,109,197 | 8/1978 | Lang et al. | 307/524 X |
| 4,195,203 | 3/1980 | Sakai et al. | 381/13 |
| 4,199,761 | 4/1980 | Whyte et al. | 179/1 GB |
| 4,227,255 | 10/1980 | Carrick et al. | 307/524 X |
| 4,286,221 | 8/1981 | Takaoka | 307/524 X |
| 4,314,377 | 2/1982 | Kondo et al. | 381/13 |
| 4,344,038 | 8/1982 | Streeter | 179/1 GS |

*Primary Examiner*—Forester W. Isen
*Attorney, Agent, or Firm*—Edward A. Onders

[57] ABSTRACT

A stereo receiver is described which is capable of receiving any two or more of the five currently proposed AM stereo system broadcast signals. The multisystem receiver includes circuitry which is used in various configuration to demodulate the stereo signal components from broadcast signals of any one of two or more of the proposed systems. Selection of appropriate elements of the receiver's circuitry for demodulating any one of the received signals is performed automatically in response to the detection of the presence of a corresponding pilot signal which is unique for each of the five different AM stereo systems that have been proposed. The receiver includes apparatus which detects the presence of such pilot signals and controls the automatic switching of such receiver circuitry. Also described is the application of such apparatus for reliably detecting the presence of the desired pilot signal in a single system stereo receiver.

18 Claims, 4 Drawing Sheets

MULTIPLE SYSTEM AM STEREO RECEIVER AND PILOT SIGNAL DETECTOR

Matter enclosed in heavy brackets [ ] appears in the original patent but forms no part of this reissue specification; matter printed in italics indicates the additions made by reissue.

BACKGROUND OF THE INVENTION

This application is a reissue of Ser. No. 298,230 *filed* Aug. 31, 1981, *now U.S. Pat. No.* 4,426,728.

This invention relates to amplitude modulation (AM) stereo receivers, and particularly to AM stero receivers which are capable of receiving broadcast stereo signals having composite amplitude and angular modulation impressed on a carrier according to different composite modulation standards.

At least five different approaches have been proposed for the implementation of stereophonic broadcasting in connection with the existing AM radio service. See, for example, the article entitled "AM Stereo: Five Competing Options"published in the IEEE "Spectrum" magazine of June 1978, at page 24, and the public file of the Federal Communications Commission's (FCC's) Docket No. 21313, the AM Stereo Broadcasting proceeding. Each of the five systems described therein uses a different modulation technique for providing an add-on stero capability to AM transmitters and suitably equipped receivers. All five proposed systems provide a composite transmitted signal which has a compatible signal format so that existing monophonic AM receivers can detect a monophonic audio signal component from the composite signal which is transmitted in each of the systems. In addition to the monophonic signal component, receivers which are specially equipped for any one of the proposed composite modulation standards will receive a stereophonic signal component, which differentiates left (L) and right (R) audio information and can be decoded and combined with the detected monophonic signal component in order to provide stereophonic sound.

One of the proposed AM stereo systems utilizes amplitude and frequency modulation (AM/FM) to develop a composite signal for transmission. In accordance with this proposed system, a carrier is frequency modulated with information corresponding ~~to~~ the difference between left and right stereo audio signals (L−R). The frequency-modulated carrier is than amplitude modulated with a signal corresponding to the sum of the left and right stereo audio signals (L+R), which is equivalent to standard monophonic amplitude modulation (AM), and the resulting composite signal is broadcast. As a result, a conventional AM receiver, which utilizes an envelope detector, detects the AM or (L+R) components of the composite signal and provides monophonic reception. A specially equipped stereo receiver will also detect the frequency modulation or (L−R) component of the composite signal. The resulting (L−R) representative audio signal can be combined with the (L+R) sgnal in an additive and subtractive matrix to produce separate (L) and (R) output audio signals for stereo listening.

Another of the proposed systems utilizes phase modulation instead of frequency modulation of the carrier (AM/PM) to transmit stereo difference (L−R) information. In this system the phase-modulated carrier is then amplitude modulation with (L+R) information to develop a composite signal which is then transmitted.

Yet another of the proposed systems utilizes a modulation technique known as compatible quadrature amplitude modulation (CQUAM) to provide a modified phase modulation of a carrier with (L−R) information. The phase-modulated carrier is thereafter amplitude modulated with (L+R) information to develop a composite signal. This composite signal may also be viewed as consisting of a pair of carriers at the same frequency but separated in phase by 90 degrees (quadrature carriers), where one carrier is amplitude modulated with left (L) stereo audio information and the other with right (R) stereo information.

Still another of the proposed systems is known as the variable compatible phase multiplex (V-CPM) system and is a modified form of quadrature system. In this system two carriers at the same frequency are separated in phase by an amount which varies between 30 degrees and 90 degrees depending on the content of the audio signals being transmitted. One of these carriers is amplitude modulated with left (L) stereo audio information and the other with right (R) stereo information and the two are linearly combined. The resultant signal can be resolved into an in-phase component representative of (L+R) information and a quadrature-phase component representative of (L−R) information. (L−R) information below 200 Hz. is eliminated to provide room for a frequency-modulated, low frequency (55 to 96 Hz) pilot signal which performs two functions. It indicates the presence of a stereo broadcast, and its modulation communicates to specially equipped stereo receivers the instantaneous phase angle between the two variable-angle carriers in this system so that such receivers can track the resulting variation in phase modulation in the transmitted signal. In a corresponding stereo receiver the composite signal may be envelope detected to provide an (L+R) audio signal and quadrature synchronous detected to derive a signal which represents the (L−R) audio information. The pilot signal is separately detected and its modulation can be used to vary the gain of the (L−R) signal channel to provide the equivalent of a variable-angle receiver which tracks the broadcast signal. The resulting (L+R) and gain-controlled (L−R) signals are then combined in a conventional stereo matrix to develop (L) and (R) signals. In addition, the developer of this system has proposed a simplified receiver in which the gain of the (L−R) channel is not varied. This corresponds to receiving the variable-angle broadcast signal at a compromise fixed angle, instead of tracking the angle variation.

Finally, there is a proposed system known as the independent sideband (ISB) system. This system phase modulates the carrier with a suitably modified (L−R) signal and then amplitude modulates the phase-modulated carrier with an (L+R) signal, where the (L+R) and (L−R) signals have been phase shifted so as to be in quadrature relationship. As a result, the lower sidebands of the resulting composite signal contain primarily left (L) stereo information whereas the upper sidebands contain primarily right (R) stereo information (hence the name "ISB"). This system is also described in the inventor's U.S. Pat. Nos. 3,218,393, 3,908,090 and 4,018,994.

The composite signal transmitted by each of the proposed systems includes a low-frequency pilot signal component for identifying the presence of a stereo broadcast. Because the pilot signal frequencies are different for each of the above-mentioned systems (AM/FM-20Hz; AM/PM-5Hz; CQUAM-25 Hz; VCPM-55 to 96 Hz; and ISB-15Hz) they also inherently identify the modulation approach used in each composite signal.

More detailed descriptions of these systems appear in the aforementioned IEEE Spectrum article, in the public file of FCC Docket 21313, and in various patents which have been issued to the proponents of these systems.

Despite significant differences in performance of the various proposed systems, the FCC has had difficulty in its attempt to choose one of these systems as the basis for a national standard for AM stereo broadcasting. As a result, the FCC is considering authorizing more than one of these systems. In this case the normal forces of free competition in the marketplace will be allowed to determine whether one of the systems will eventually become the predominant AM stereo system, or whether two or more system can coexist.

It is, therefore, an object of the present invention to provide a receiver capable of receiving AM stereo signals which have composite modulation according to any one of two or more of the various proposed modulation techniques.

It is a further object of the present invention to provide an AM stereo receiver capable of detecting the pilot signal used in conjunction with any one of the various proposed AM stereo broadcast techniques.

It is a further object of the present invention to provide an AM stereo receiver capable of automatically distinguishing, by reason of the pilot signals, which of the various proposed modulation techniques is being used in a particular received AM stereo broadcast signal.

SUMMARY OF THE INVENTION

In accordance with the present invention, there is provided in a receiver for stereophonic broadcast signals which include a modulation component comprising a pilot signal having a selected frequency characteristic, apparatus for determining the presence or absence of such pilot signals. In such apparatus there is provided means for detecting received signal components which lie within a first band of frequencies which includes said pilot signal, and for also detecting received signal components which lie within at least one other band of frequencies located above or below the first band. There is also provided means for evaluating the signals detected in such first and other bands, and for developing an output signal which indicates when signals in the first band exceed a first level and signals in the other band do not exceed a second level.

In accordance with another aspect of the present invention there is provided in a receiver for a plurality of different types of AM stereophonic broadcast signals, each of which includes a modulation component comprising a pilot signal having a selected frequency characteristic that is unique to that type of AM stereophonic broadcast signal, apparatus for determining the presence of any one of such pilot signals, thereby indicating which type of AM stereophonic broadcast signal is being received. The apparatus includes means for detecting received signal components which lie within a plurality of narrow frequency bands, each of which includes only one of said pilot signals. There is also included means for evaluating the signals detected in each of such frequency bands, and for developing an output signal which indicates when signals in one of the bands exceed a predetermined level and signals in all other bands do not exceed said level and which also indicates which of the plurality of bands such one band is, thereby indicating which type of AM stereophonic broadcast signal is then being received.

Finally, in accordance with another aspect of the present invention, there is provided a receiver for receiving and demodulating composite amplitude-modulated (AM) stereophonic broadcast signals comprising a carrier having amplitude modulation, representative of stereo sum (L+R) information, and angular modulation, representative of stereo difference (L−R) information, impressed on the carrier according to one of at least two composite modulation techniques, the angular modulation further including a pilot signal component having a selected frequency characteristic representative of such one composite modulation technique. Such a receiver includes means for receiving composite AM stereo signals and for converting such signals to corresponding intermediate frequency (IF) signals. It also includes means for amplitude demodulating said IF signal to derive therefrom a signal representative of the (L+R) information. The system also includes angular demodulating means for demodulating such IF signal according to the requirements of the first and second composite modulation techniques to develop corresponding first and second audio frequency output signals representative of (L−R) information transmitted according to such first and second composite modulation techniques. There is provided means for detecting received signal components which lie within a first narrow band of frequencies which include the pilot signal which is representative of such first composite modulation technique, and for also detecting received signal components which lie within a second narrow band of frequencies which include the pilot signal which is representative of such second composite modulation technique. The receiver also includes means for evaluating the signals detected in the first and second bands and for developing one or more output signals which indicate when signals in only one of the frequency bands exceed a predetermined level and in which of the two bands such signals lie. The receiver further includes means, responsive to the output of the evaluating means and having the first and second audio output signals supplied thereto, for passing such first or second signal only when the output of the evaluating means indicates that the corresponding pilot signal is present in the received signal. The receiver finally includes means for utilizing the (L+R) representative signal and the audio signal passed by such last mentioned means for deriving left (L) and right (R) stereo audio output signals.

For a better understanding of the present invention, together with other and further objects thereof, reference is made to the following description, taken in conjunction with the accompanying drawings, and its scope will be pointed out in the appended claims.

DESCRIPTION OF THE INVENTION

Figure 1:
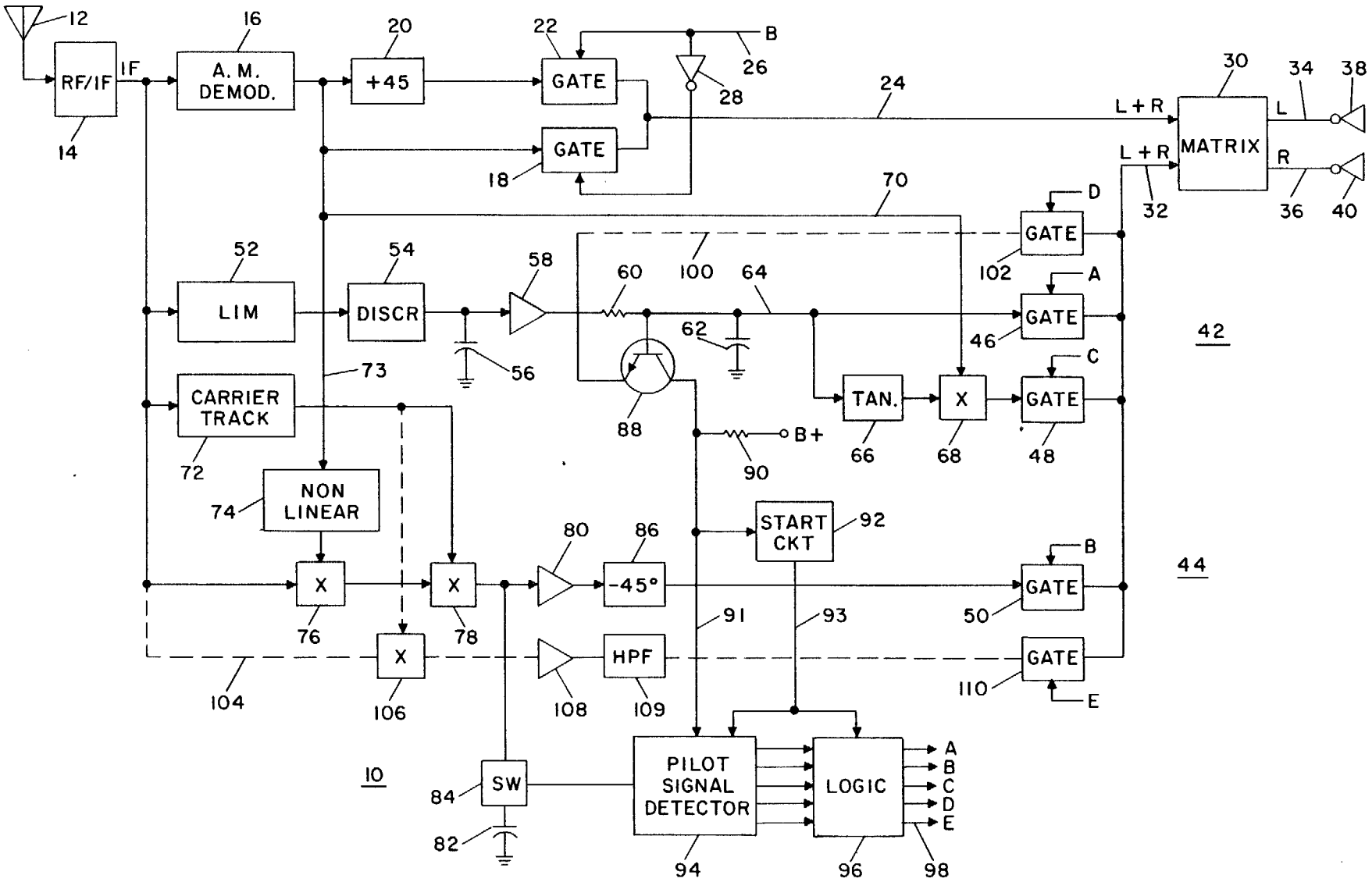
FIG. 1 is a partially schematic and partially block diagram of an AM stereo receiver in accordance with the present invention.

FIG. 1 illustrates a multi-system AM stereo receiver 10 embodying the present invention in one form. For purposes of example, receiver 10 is capable of receiving AM stereo signals incorporating three of the proposed modulation approaches: (ISB) AM stereo signals, (AM/PM) stereo signals, and (CQUAM) stereo signals. Also shown in receiver 10, indicated by dotted line connections, are additional circuit elements for receiving (AM/FM) stereo signals and (V-CPM) stereo signals, as will be further described. The receiver of FIG. 1 includes a receiving antenna 12, coupled to suitable RF, frequency translation, and IF circuitry 14, which, may be of conventional design. The IF output of unit 14 is coupled to an AM demodulator 16, which may be a conventional envelope detector or other suitable amplitude modulation detector for detecting the AM component of supplied IF signals. The output of demodulator 16 is coupled directly to gate 18 and it also coupled to gate 22 via phase shift network 20, which provides a relative phase shift of approximately 45 degrees for audio frequencies over a reasonably wide band such as 100–5000 Hz. Phase shift network 20 is required for ISB stereo signal decoding in accordance with the phase shift technique which is well understood in the art. Gate 22 is activated by an ISB control signal designated (B), which is developed when an ISB pilot signal is detected by circuits 94, 96, as will be further described. In the absence of control signal (B), herein designated as a "zero" signal state, inverter 28 provides a signal to maintain gate 18 open, which allows the non phase-shifted output of AM demodulator 16 [representative of (L+R), or stereo sum information] to be applied to stereo matrix 30 over lead 24. When the ISB AM stereo signal is being received control signal (B) changes to a "one" signal state which opens gate 22. Inverted control signal (B) closes gate 18, and the phase-shifted output signal from AM demodulator 16 is thereby supplied to stereo matrix 30 over lead 24.

Matrix 30 is also provided with an (L−R) stereo difference information signal over lead 32, which is developed by demodulating the IF signal from unit 14 according to the particular stereo modulation technique used in the AM stereo signal then being received, as will be further described hereinafter. Matrix 30 may be a conventional stereo matrix such as is currently used in FM stereo receivers. Matrix 30 adds and substracts the audio (L+R) and (L−R) signals thereby deriving separate (L) and (R) audio output signals which are provided on output leads 34 and 36 and may be coupled to speakers 38 and 40, respectively.

The remaining circuits of the receiver 10 include circuit portion 42 which is provided for phase demodulating received signals which have stereo difference (L−R) modulation components according to the AM/PM or CQUAM modulation techniques. Circuit portion 44 is provided for demodulating received signals which have (L−R) modulation components according to the ISB modulation technique.

Gates 46, 48 and 50 are provided with control signals (A), (C), and (B), respectively, which open the respective gates when logic circuit 96 determines that an AM/PM, CQAM or ISB AM stereo signal, respectively, is being received, based on the detection of the corresponding pilot signal. For example, if logic circuit 96 determines that an AM/PM stereo signal is being received, control signal (A) is outputed, which opens gate 46, thereby to supply a corresponding (L−R) signal to matrix 30. If logic circuit 96 determines that an ISB AM stereo signal is being received, it provides a control signal (B) to open gate 50, thereby allowing the corresponding (L−R) signal to be supplied to matrix 30. As stated previously, control signal (B) also changes the states of gates 18 and 22, thereby allowing the phase-shifted (L+R) sgnal from network 20 to be supplied to matrix 30. In the event that logic circuit 96 determines that a CQUAM stereo signal is being received, it provides a control signal (C) to open gate 48, thereby allowing the corresponding (L−R) signal to be supplied to matrix 30. In the absence of any of the control signals (A), (B) and (C), only gate 18 is open, because of inverter 28, and, therefore, the receiver provides only monophonic performance, since only an (L+R) signal is applied to matrix 30.

The receiver elements 42 for phase demodulating AM/PM stereo signals include a limiter 52, which provides appropriate limiting (for example 40 db) for received AM/PM and CQUAM composite signals. Limiter 52 effectively removes AM from the supplied IF signal and provides the limited signal (containing PM components) to discriminator 54, which performs frequency demodulation of the limited signal. The output signal from discriminator 54 is amplified in amplifier 58 and corresponds to frequency variations of the limited signal. Capacitor 56 is selected to provide an IF bypass for the output of discriminator 54. Resistor 60 and capacitor 62 form an integrating circuit which converts the frequency-demodulated signal, available at the output of amplifier 58, to a phase-demodulated signal representative of (L−R), which is then supplied, via gate 46, to matrix 30 in the event control signal (A) is present to indicate that the received signal is an AM/FM type stereo signal. The phase demodulated signal is also provided to the combination of tangent circuit 66 and multiplier 68, which modifies the phase demodulated signal as required by the CQUAM stereo technique. The reason for this modification, as well as alternative circuitry for achieving the same result, are disclosed in the references cited previously herein and in U.S. Pat. No. 4,172,966. Multiplier 68, in accordance with the teaching of that patent, is provided with an (L+R) signal derived from the output of AM demodulator 16 over lead 70. The output of Multiplier 68 is supplied to matrix 30, via gate 48 if control signal (C) is present to indicate that the received signal is a CQUAM stereo signal.

Circuit portion 44 contains components which are used in connection with the demodulation of ISB stereo signals to produce a corresponding stereo difference (L−R) signal. These components include a carrier tracking circuit 72, which regenerates the original carrier frequency signal, for example by use of one or more phase-locked loops as described more fully in the inventor's U.S. Pat. Nos. 3,973,203 and 4,081,994. The IF signal from unit 14 is coupled to carrier track circuit 72 and is also coupled to multiplier 76 wherein it is combined with a non-linear derivative of the demodulated stereo sum signal supplied from AM demodulator 16 via lead 73. The operation performed by the combination of nonlinear circuit 74 and multiplier 76 is also known as inverse amplitude modulation or simply inverse modulation, and is more fully described in the inventor's prior U.S. Pat. No. 4,018,994. The output of multiplier 76 is combined with the regenerated carrier in a further multiplier 78, which functions as a synchronous quadrature detector and whose output is a corresponding stereo difference (L−R) signal, which is amplified in amplifier 80 for equalization with respect to the stereo sum signal (L+R) channel. However, in accordance with the phase shift technique for ISB stereo signal detection, the (L−R) signal present at the output of detector 78 must be phase shifted by 45 degrees. This is a accomplished in phase shift network 86. The resulting phase shifted (L−R) signal is supplied to matrix 30 via gate 50. Gate 50 opens when provided with a control signal (B) from logic circuit 96, indicating that an ISB stereo signal is being received.

Additional circuits are shown connected by dotted lines in FIG. 1 for implementation of additional AM stereo reception capability. Lead 100 and gate 102 provide a corresponding frequency demodulated (L−R) signal to matrix 30 in the event an (AM/FM) stereo signal is being received, which is indicated when control signal (D) is outputted from logic 96. Lead 104 and quadrature detector 106 are provided for simplified fixed-angle demodulation of the (L−R) component of a V-CPM stereo signal. The output of quadrature detector 106 is supplied to amplifier 108 which provides increased amplification with respect to the stereo sum signal (L+R) channel (AM demodulator 16 and gate 18 in this case) for signal equalization. The output of amplifier 108 is provided to matrix 30 via gate 110 when control signal (E) is provided by logic circuit 96, indicating the reception of a V-CPM stereo signal.

In the foregoing description, reference has been made to the existence of different pilot signal components in the received stereo signals, which are used to determine which type of stereo signal is being received (i.e. AM/PM, CQUAM or ISB) so that appropriate demodulation circuitry may be engaged. As noted previously, each of the different AM stereo modulation techniques proposed uses a low frequency pilot signal (frequency of phase modulated on the carrier) in order to indicate to stereo receivers the presence of a stereo broadcast. Because the frequency of this pilot signal is different for each of the five AM stereo systems considered herein, the pilot signal can be used in an AM stereo receiver to identify which stereo broadcast technique is being received. As noted earlier, the AM/PM stereo system used a pilot signal of 5 Hz in the stereo difference signal channel. The ISB system uses a 15 Hz. pilot signal, the AM/FM systems uses a 20 Hz. pilot signal, and the CQUAM system uses a 25 Hz. pilot signal. Finally, the V-CPM system uses a pilot signal which varies between 55 Hz and 96 Hz. Since the V-CPM pilot signal frequencies are in the audible range, it is necessary to eliminate them from the stereo signal output of the (L−R) channel for V-CPM stereo signal reception. Accordingly, highpass filter 109 is provided in the V-CPM (L−R) signal channel portion of the multiple-system AM stereo receiver shown in FIG. 1 for passing signals above 200 Hz., for example.

The receiver 10 of FIG. 1 makes use of the various pilot signal components in received AM stereo signals to generate control signals (A), (B) and (C) [and also (D) and (E) if the additional dotted line circuitry is incorporated in the receiver]. The control signal generating circuits rely on the fact that different pilot signal frequencies are used in each of the different AM stereo systems. The control signals generated in response to reception of the different pilot signals indicate which, if any, of the AM stereo signal types is being received and activates gates 46, 48, 50, 102 and 110 according to the type of stereo signal received, thereby to couple the corresponding (L−R) stereo difference signal to matrix 30. Gates 18 and 22 are also activated by the control signal (B) to provide appropriate gating of the stereo sum signal (L+R) according to whether an ISB stereo signal, or another type of stereo signal, or a monophonic signal is being received.

The detection of the different pilot signals is performed by pilot signal detector 94 operating in conjunction with logic circuit 96, the latter of which generates the control signals (A) through (C), or (A) through (E), on corresponding separate output leads 98. The input signal for pilot signal detector 94 is taken from the output of frequency detecting circuitry 54, 56, 58, which is integrated by resistor-capacitor combination 60, 62 to provide a phase-demodulated audio signal. Since all five of the proposed AM stereo systems make use of angular modulation techniques to transmit the pilot signals, it is possible to detect the pilot signal for all systems from this phase-demodulated signal. However, the pilot signal component can be detected in any angular demodulated signal, such as the frequency-demodulated signal which exists at the output of discriminator 54 or the output of quadrature detectors 78 and 106. As used herein the term angular modulation includes both frequency modulation and phase modulation. It is recognized that all of the systems make use of slightly different forms of angular modulation for the stereo difference (L−R) signal, but the phase-demodulated signal which appears between resistor 60 and capacitor 62 will contain the pilot signal component for any of these systems, although it may be shifted in phase or amplitude with respect to the stereo difference signal (L−R) component as properly demodulated. The demodulated pilot signals are amplified by transistor 88, which is connected across low resistance load 90, and provided over lead 91 to pilot signal detector 94. This demodulated signal is also provided to start circuit 92 which detects sudden substantial changes in the output of the phase demodulation circuitry. Such changes indicate either that the receiver has initially been turned on and has started to receive a station, or that the receiver has been returned to a different frequency in the AM broadcast band and a new station has begun to be received by the receiver. Sudden changes in the phase demodulation circuit output trigger an output signal from circuit 92, thereby starting the pilot signal detection process which is carried out by detector 94 and logic circuit 96, as will be further described. As an alternative to detecting changes in the phase demodulation output, the same result could be achieved by detecting directly the operation of the receiver's on/off and turning controls.

Capacitor 82 comprises an IF bypass capacitor which is connected in the ISB stereo signal receiving circuit portion 44. Switch 84 is used in one embodiment to provide a timing signal for pilot signal detector 94 and makes use of capacitor 82. It will be recognized by those skilled in the art that capacitor 82 could be directly connected to the output of quadrature detector 78, in which case switch 84 could be connected to capacitor 56 or to a separate capacitor provided only for use in connection with the timing of pilot signal detector 94, as will be further described.

Figure 2:
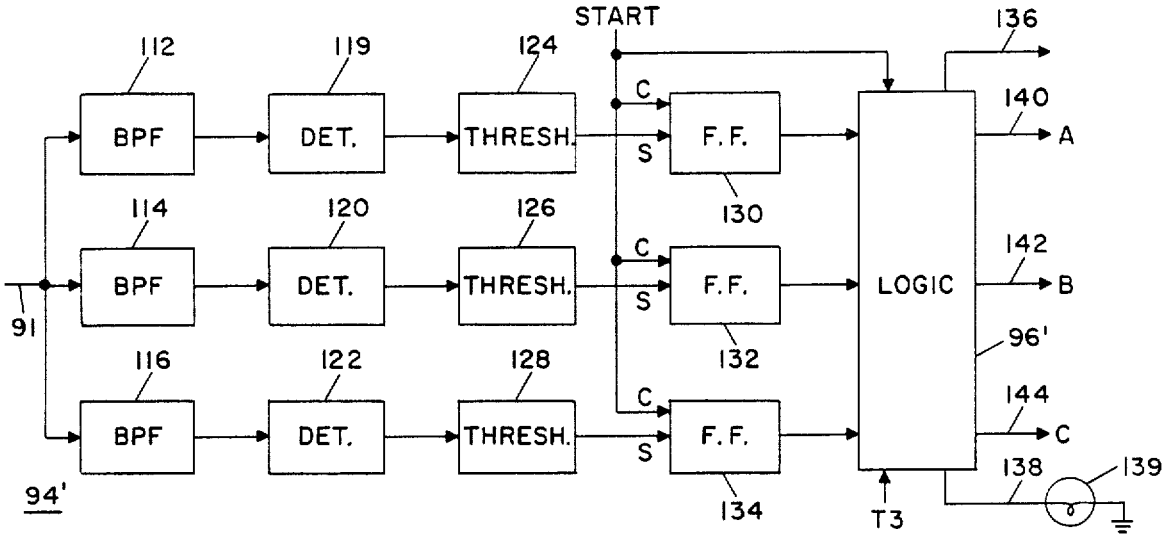
FIG. 2 is a block diagram of a pilot signal detecting apparatus in accordance with the present invention.

Referring to FIG. 2, there is shown in block diagram form a pilot signal detecting circuit 94' which is usable not only in the multiple-system AM stereo receiver of FIG. 1, but also in single system AM stereo receivers as will be described hereinafter. The output of amplifying transistor 88 in FIG. 1 is supplied over lead 91 to bandpass filters 112, 114 and 116. In a single system receiver, where only a single pilot signal must be detected, bandpass filters 112, 114 and 116 are narrowband filters arranged to pass bands of frequencies respectively below, at, and above the desired pilot signal frequency. Thus, if the circuit 94' of FIG. 2 is used to detect only an ISB AM stereo pilot signal, for example, filter 114 would be a narrowband filter which passes 15 Hz. plus and minus approximately 2.5 Hz, for example. In this case, filter 112 would be tuned below the nominal pilot signal frequency and would pass, as an example, 10 Hz. plus and minus 2.5 Hz. and filter 116 would be tuned to a frequency higher than the expected pilot signal, for example, 20 Hz. plus and minus 2.5 Hz. Each of the filters 112, 114 and 116 is coupled to a corresponding one of the detecting circuits 119, 120 and 122 and then to one of the threshold circuits 124, 126 and 128. If only a pilot signal at the nominal pilot signal frequency of 15 Hz. is present on lead 91, with sufficient amplitude, detector 120 will provide a signal which exceeds the threshold set in threshold circuit 126 and thereby sets flip-flop 132. Since it has been assumed that there are substantially no signals within the passbands of filters 112 amd 116, flip-flops 130 and 134 will not be set by the corresponding threshold circuits 124 and 128. In the event substantial noise or other spurious signals are present on lead 91, it is anticipated that the noise will be sufficiently broadband so that detectors 119, 120 and 122 will all develop sufficient output to trigger their corresponding threshold circuits 124, 126, 128, thereby setting all flip-flops 130, 132 and 134. For lower noise levels or noise having a different spectral content, only two of the flip-flops, for example 130 and 132 or 132 and 134, might be set. After a time interval sufficient for the narrowband filters 112, 114, 116 and detectors 119, 120, 122 to respond to a received pilot signal and/or noise, the logic circuit 96' evaluates the outputs of flip-flops 130, 132 and 134 and provides an output signal (B) on lead 142 indicating the existence of the desired 15 Hz pilot signal only if corresponding flip-flop 132 is set and the other flip-flops 130 and 134 are not set. In the event more than one flip-flop is set, logic circuit 96' concludes that the flip-flops were triggered by noise or other spurious signals and does not generate any output signal.

In the configuration shown in FIG. 2, the pilot signal detector 94' and logic circuit 96' also may be used for detecting three pilot signals corresponding to three of the five proposed AM stereo systems. In one embodiment, which is illustrated by the solid lines of the receiver 10 of FIG. 1, the receiver is adapted to receive three types of AM stereo transmissions. The first type, designted by control signal (A), is the AM/PM technique, which has a pilot signal frequency of 5 Hz. The second type, designated by control signal (B), is the ISB technique, which has a pilot signal frequency of 15 Hz. The third type, designated by control signal (C), is the CQUAM technique, which has a pilot signal frequency of 25 Hz. If the circuit 94' shown in FIG. 2 is to be used in connection with the detection of these three pilot signals, filters 112, 114 and 116 would be arranged to each pass only one of the pilot signal frequencies. Accordingly, filter 112 would be arranged to pass 5 Hz. plus and minus 1 Hz., filter 114 would be arranged to pass 15 Hz. plus and minus 1 Hz. and filter 116 would be arranged to pass 25 Hz. plus and minus 1 Hz. Each of the flip-flops 130, 132 and 134 would, therefore, be set by an output of threshold detectors 124, 126 and 128 which indicates the existence of the corresponding pilot signal. Again, logic circuit 96' determines which of flip-flops 130, 132 and 134 have been set and provides a control signal output on one of the control leads 140, 142 and 144 indicating the presence of one of the pilot signals only if its corresponding flip-flop has been set and the other flip-flops have not been set. If any two or more of the flip-flops are set, no output control signal is generated by logic circuit 96'. It is desirable that only by such a clear indication of a received pilot signal should receiver 10 be placed in a stereo reception mode by activation of the gate or gates corresponding to the stereo modulation technique indicated by the received pilot signal.

Logic circuit 96' is reset by the output of start circuit 92 over lead 93 as indicated in FIG. 2 and this signal is also used to reset flip-flops 130, 132 and 134. Logic circuit 96' is also provided with a timing signal T3 which indicates the time at which the outputs of flip-flops 130, 132 and 134 should be evaluated, as will be further explained. Output 136 from logic circuit 96' may be provided to indicate that no clear decision has been made that any of the pilot signals has been received, thereby to cause receiver 10 to operate in its monophonic mode. Logic circuit 96' also includes an output lead 138 which is connected to stereo indicator lamp 139. Circuit 96' provides a signal on lead 138 whenever any one of the control signals (A), (B) or (C) is generated.

Figure 3:
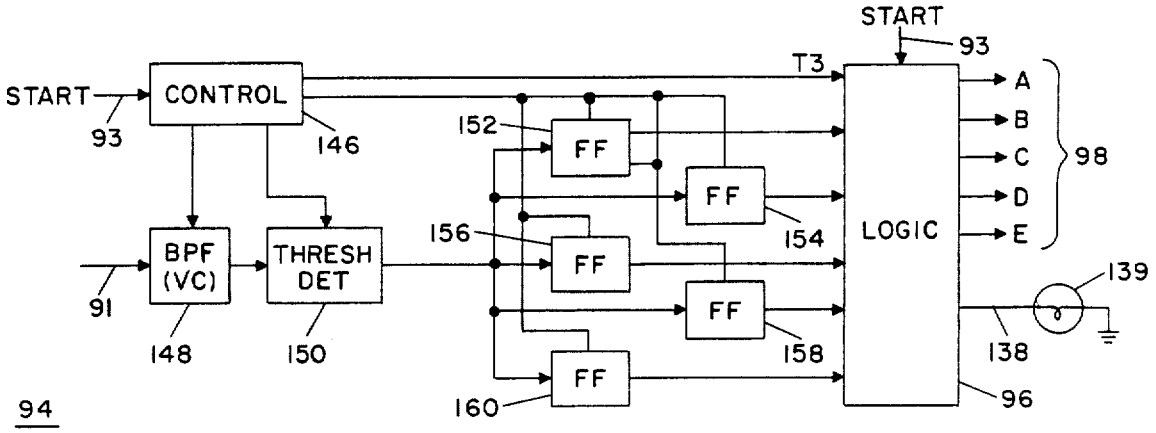
FIG. 3 is a block diagram of an alternative embodiment of a pilot signal detecting apparatus in accordance with the present invention.

FIG. 3 is a block diagram of an alternative embodiment of a pilot signal detector and logic circuit in accordance with the present invention. The pilot signal detecting circuit embodiment 94, shown in FIG. 3, is useful in connection with detecting pilot signals for as many as all five of the AM stereo broadcast systems described previously herein. Referring to FIG. 3, there is shown a control circuit 146 which receives a start signal from start circuit 92 over lead 93. The control unit 146 provides control signals to a voltage-controlled, narrowband bandpass filter 148, to threshold detector 150, to flip-flops 152, 154, 156, 158 and 160, and to logic circuit 96. The control voltage supplied to filter 148 initially sets this filter to the frequency of a first pilot signal, for example the 5 Hz. pilot signal of the AM/PM stereo system. The filter is held at the 5 Hz. frequency for a sufficient period to provide an output to threshold detector circuit 150, for example 300 milliseconds. Circuit 150 detects the signal present at the output of filter 148 and compares the detected signal with an adjustable threshold which is set by the control signal from Unit 146. Flip-flop 152 is conditioned to respond to the output of threshold detector 150 during this initial period, and if the output of filter 148 triggers threshold detector 150 during this initial first sampling period, flip-flop 152 will be set. Control logic 146 provides a control signal to flip-flop 152 to enable it only during this first period.

Subsequent to the 5 Hz. sampling by filter 148 during the first period, control circuit 146 provides a different control signal voltage to controllable bandpass filter 148 to reset it at a second frequency, for example the 15 Hz. pilot signal frequency used in the ISB stereo system. Control circuit 146 may also provide a control signal to threshold detector 150 to adjust its threshold level to correspond to the anticipated strength of the ISB pilot signal. Threshold detector 150, if it detects a 15 Hz signal during this second sampling period, sets flip-flop 154, which is enabled, or conditioned to be set, only during this second sampling period by control circuit 146.

At the end of the second period, control circuit 146 resets bandpass filter 148 to the next pilot signal frequency, for example the 20 Hz. pilot signal of the AM/FM stereo system. Flip-flop 156 is set if a 20 Hz. signal is detected by threshold detector 150 during the third sampling period. Similarly flip-flips 158 and 160 are set if the threshold detector 150 detects signals during the fourth and fifth sampling periods, when the bandpass filter 148 is tuned to the 25 Hz. pilot signal used in the CQUAM stereo system and then to the 55 to 96 Hz. variable frequency signal used in the V-CPM stereo system, respectively. Alternatively, because of the wider bandwidth required it may be necessary to gate in a separate filter to detect the variable frequency pilot signal used in the V-CPM system.

After sequentially sampling the different frequency bands for the five different pilot signals during five consecutive periods and setting of flip-flops 152, 154, 156, 158 and 160 according to whether or not a signal is detected in each of the pilot signal passbands, logic circuit 96 is activated by a timing signal T3 to enable the logic circuit to evaluate the outputs of flip-flops 152, 154, 156, 158 and 160. Logic circuit 96 operates in a manner similar to the logic circuit 96' shown in FIG. 2 and provides output signals (A), (B), (C), (D) and (E) on leads 98 to operate the corresponding gates in receiver 10 of FIG. 1 in the event one, and only one, pilot signal has been detected as being present during the first five sampling periods. In addition, a separate signal is also provided on lead 138 in this case to activate stereo indicator lamp 139. If signals in more than one of the pilot signal bands are detected, the result indicates an ambiguity as to which AM stereo modulation technique is present in the received IF signal or that significant noise or other spurious signals are present. Accordingly, under this condition logic circuit 96 will not provide any output on any of the leads 98 and 138, and stereo indicator lamp 139 will not be lit. Receiver 10 will, therefore, operate in the monophonic mode until such time as a single pilot signal has been detected during a complete sampling cycle.

It will be recognized that the circuit 94 in FIG. 3 operates by sequential sampling of different frequency bands whereas circuit 94' in FIG. 2 operates to simultaneously sample all of the frequency bands of interest. Those skilled in the art will recognize that either sequential or simultaneous sampling can be used for detecting one or more of the different pilot signals. Following the initial sampling by logic circuit 96 of all of the outputs of the flip-flops in FIG. 3, if no single pilot signal has been determined to be present, it may be desirable to reset control circuit 146 and repeat the pilot signal detection process once or a few times. Once only a single pilot signal has been detected during a sampling cycle, the re-cycling can be stopped. This function can be implemented, for example, by feedback to control circuit 146 from logic circuit 96.

Figure 4:
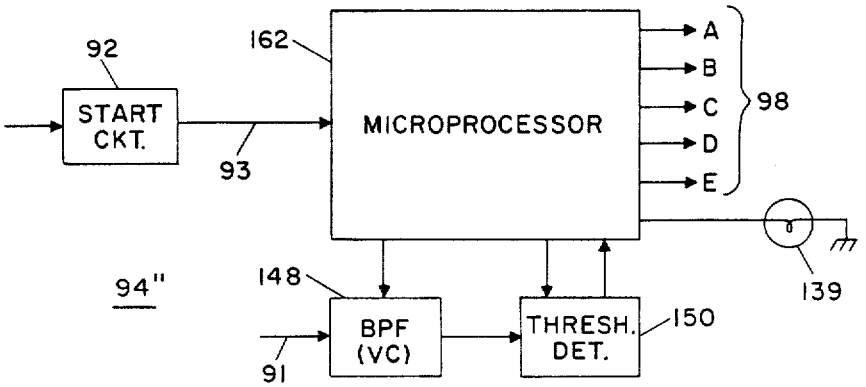
FIG. 4 is a block diagram of another alternative embodiment of a pilot signal detecting apparatus in accordance with the present invention.

FIG. 4 illustrates another pilot signal detecting and logic circuit arrangement which makes use of a programmed microprocessor to perform the logic functions described with respect to FIGS. 2 and 3. Start circuit 92 provides an initiation signal to microprocessor 162, which thereafter controls variable bandpass filter 148 and threshold detector 150 to provide sequential sampling of the various pilot signal frequency bands as described with reference to FIG. 3. The output of threshold detector 150 for each frequency band can be examined by microprocessor 162 and the result stored therein for later analysis to determine whether one and only one pilot signal has been detected during a sampling cycle.

Figure 8:
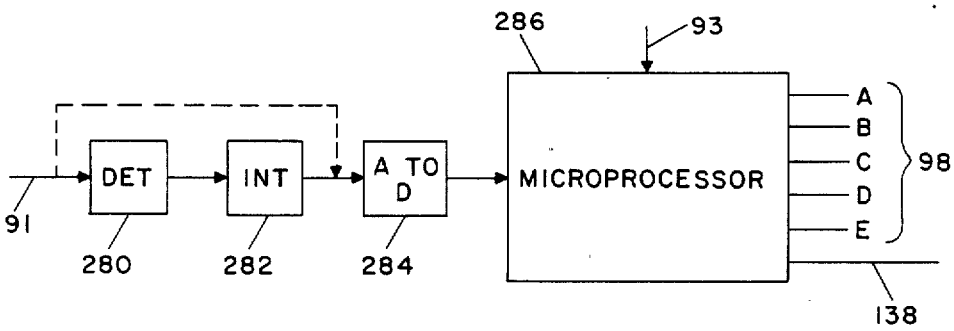
FIG. 8 is a block diagram of a pilot signal detector using a microprocessor to provide digital filtering.

In FIG. 8 there is illustrated another pilot signal detector and logic circuit arrangement which makes use of a microprocessor for the narrowband filtering function as well as for the logic functions. Lead 91 carrying the phase-detected pilot signals is coupled to amplitude detector 280, which may include a low pass filter to remove higher frequency audio modulation components. Detector 280 supplies the detected output to integrator 282, which averages this signal over a suitable time interval (1 to 10 milliseconds, for example), also removing high frequency components. The integrator output is converted to a digital signal for each time interval by analog-to-digital converter 284, and the digitized signal level is provided to microprocessor 286 for analysis. The microprocessor may perform a digital filtering function by taking weighted sums of the digitized detected signal for the various pilot signal frequencies and comparing these weighted sums to preselected threshold values to determine presence or absence of the particular pilot signal or signals of interest. An advantage of this embodiment of the invention is that analog to digital converter 284 need only handle one polarity of signal, thereby simplifying the design of block 284. However, a preferred arrangement would be to delete detector 280 and integrator 282, convert the signal on lead 91 directly into digital form in A-to-D converter 284 and then do all of the signal processing digitally in microprocessor 286. By the following this procedure one avoids the generation of undesired nonlinear products which are often introduced by the action of detector 280.

In FIGS. 3 and 4, there is shown a control lead from control circuit 146 or microprocessor 162 to threshold detector 150. This control lead is used to approximately adjust the threshold level of the threshold detector in order to compensate for expected differences in signal strength among the various pilot signals, resulting from the fact that different amounts of angular modulation are used in developing the various AM stereo broadcast signals. This will become clear to those skilled in the art from an examination of the broadcast signal specifications which have been published for each of the proposed AM stereo systems.

Figure 5:
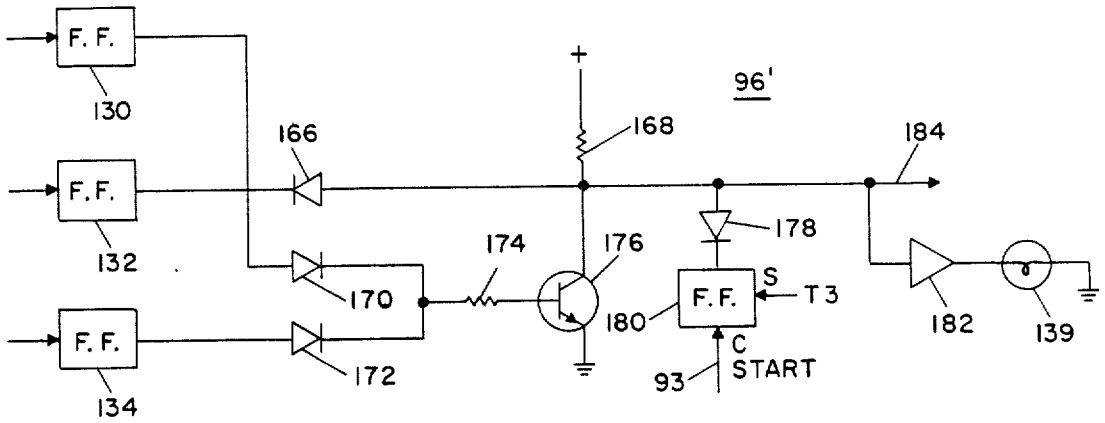
FIG. 5 is a schematic diagram of a logical circuit usable in the present invention.

FIG. 5 is a circuit diagram of a logic circuit 96' which is usable in connection with the pilot signal detecting arrangement of FIG. 2 for the purpose of detecting the presence of a single pilot signal and the absence of signals in adjacent frequency bands. As previously described with respect to FIG. 2, for the detection of a single pilot signal, for example the ISB pilot signal, flip-flops 130, 132 and 134 are set according to whether signals have been detected at frequencies below, at, and above the frequency of the expected pilot signal. Assuming that the desired pilot signal has been received, and no signal has been detected in the frequency bands above and below the pilot signal frequency, flip-flop 132 would be in a set condition, while flip-flops 130 and 134 would not be set. The set condition of flip-flop 132 causes a reverse bias on diode 166 which raises the output level on lead 184 to indicate a binary "one", provided that flip-flop 180 is in a set condition and transistor 176 is not conducting as hereinafter will be described. In the event that there is a "one" output from flip-flop 130 or 134, the high output will be conducted through diodes 170 or 172 and through resistor 174, and thereby cause transistor 176 to conduct. This will lower the output on lead 184 to a "zero" signal condition. This condition occurs if there is a signal detected in the frequency band either below or above the frequency band of the pilot signal of interest, and would be indicative that the signal which set flip-flop 132 might have been caused by noise. Flip-flop 180 is cleared by the start signal on lead 93 which is supplied from circuit 92. While cleared, diode 178 conducts, and the output on lead 184 is a "zero". Flip-flop 180 is set by timing signal T3, indicating that the time for sampling the three frequency bands has been completed. When flip-flop 180 is set, diode 178 is reverse biased, and a "one" output on lead 184 is supplied, provided that a "one" is present at the output of flip-flop 132. Amplifier 182 is connected to lead 184 to drive stereo indicating lamp 139. Circuit 164 therefore operates to provide a "one" output on lead 184, indicated by a positive voltage, in the event that flip-flop 132 is set and flip-flops 130 and 34 are not set. The output on lead 184 is enabled after timing signal T3 is provided to flip-flop 180.

Figure 6:
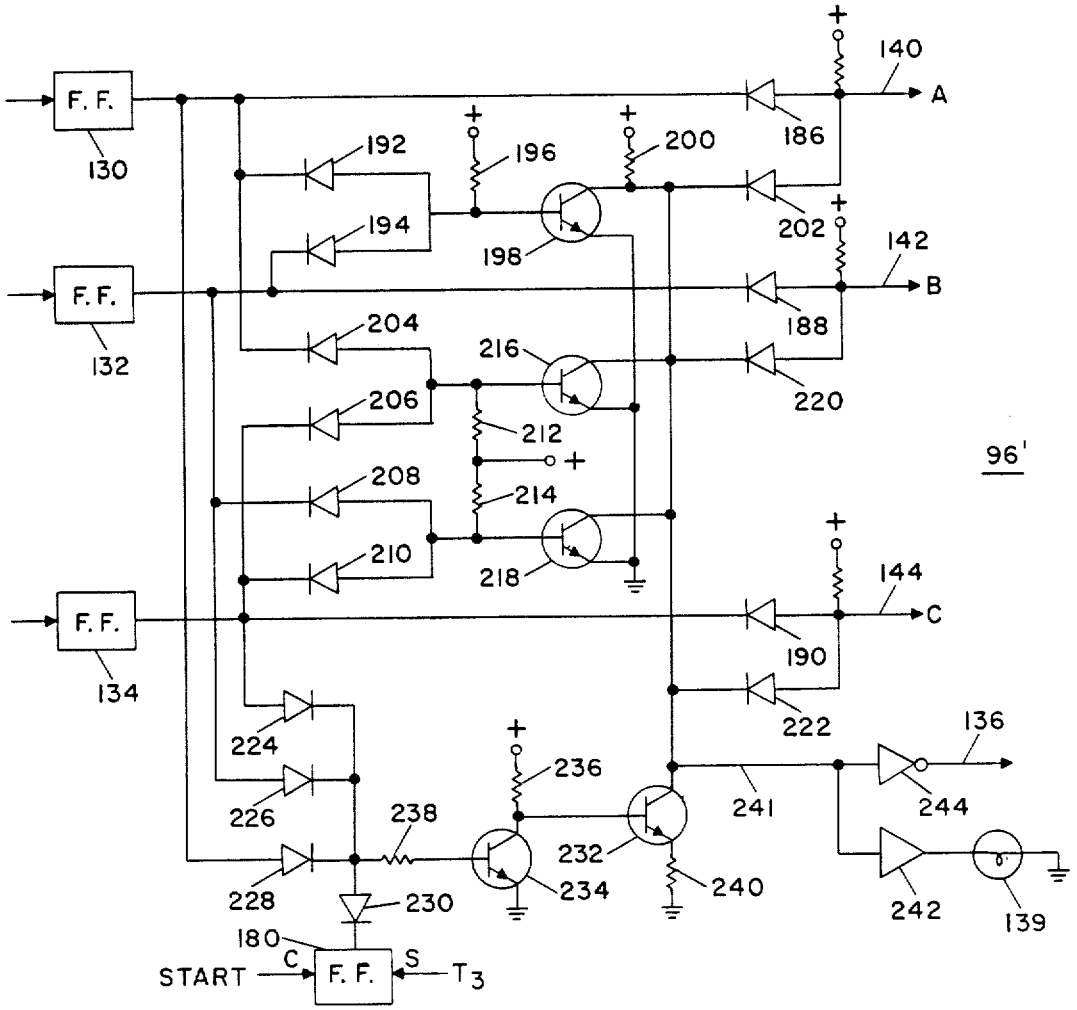
FIG. 6 is a schematic diagram of another logic circuit usable in the present invention.

FIG. 6 is a more complex logic circuit arrangement for use in connection with the detection of any one of three different pilot signals. For example, this logic circuit can be used in connection with the receiver of FIG. 1 when arranged to receive an AM/PM stereo signal, with a pilot signal of 5 Hz., an ISB stereo signal, with a pilot signal of 15 Hz. or a CQUAM stereo signal, with a pilot signal of 25 Hz. Flip-flops 130, 132 and 134 are controlled by simultaneous or sequential operating bandpass filters and threshold detecting circuits (such as are shown in FIGS. 2 and 3) tuned to the 5 Hz., 15 Hz. and 25 Hz. pilot signal frequencies.

If flip-flop 130 is in a "one" condition, indicating the reception of a pilot signal at 25 Hz., and flip-flops 132 and 134 have a "zero" output, indicating no reception of pilot signals or other signals at 15 and 25 Hz., output lead 140 corresponding to control signal (A) is enabled. The positive output of flip-flop 130 reverse biases diode 186. Diode 202 is reverse biased, provided that one of transistors 198, 216 or 218 are conducting. Each of these transistors is conducting only if two of the flip-flop outputs have a "one". For example, transistor 198 has its base connected through diodes 192 and 194 to the outputs of flip-flops 130 and 132. These diodes are also connected to a positive voltage source through resistor 196. In the event both flip-flops 130 and 132 have a "one" output, both of these diodes will be reverse biased, and transistor 198 will conduct causing diode 202 to conduct and bring the output on lead 140 to the "zero" state. Likewise, transistor 216, which has its base connected to the positive voltage supply by resistor 212 and connected to the outputs of flip-flops 130 and 134 by diodes 204 and 206, will conduct in the event that both flip-flops 130 and 134 have a positive voltage or "one" output. Also transistor 218, which is connected through its base to the positive voltage supply by resistor 214 and to the outputs of flip-flops 132 and 134 through diodes 208 and 210, will conduct if the outputs of both flip-flops 132 and 134 have a positive "one" signal. Thus the combination of transistors 198, 216 and 218 will bring down the voltage through diode 202 in the event that any pair of two flip-flops have a "one" output. This provides the output lead 140 with a "zero" output in the event that any pair of flip-flops have a "one". The output control signals (B) and (C) on leads 142 and 144 are likewise connected to these transistors by diodes 220 and 222, and connected to their respective flip-flops 132 and 134 through diodes 188 and 190. Accordingly, each of the output leads 140, 142 and 144 will be enabled if, and only if, its corresponding flip-flop 130, 132 and 134 has a "one" output, and all other flip-flops have a "zero" output.

The circuit of FIG. 6 also includes circuit elements for providing a stereo indicator output. The outputs of all three flip-flops 130, 132 and 134 are connected over diodes 224, 226 and 228 through resistor 238 to transistor 234. In the event that any of the flip-flops 130, 132 and 134 has a "one" output, and the base of transistor 234 is not brought down by the operation of flip-flop 180, through diode 230, a previously described, transistor 234 will conduct. This applied a low voltage input to transistor 232, which is otherwise in a conducting state by reason of the voltage provided from a positive voltage supply through resistor 236. Transistor 232 therefore shut off, allowing the voltage on lead 241 to go high. This voltage will go high provided that none of transistors 198, 216 and 218 brings the voltage low, as previously described, and there is provided an output signal on lead 241 in the event that any one of the stereo system pilot signals, and no other pilot signals, have been detected. The output on lead 241 is provided over drive 242 to stereo indicator lamp 139. An inversion circuit 244 may also be provided to give an output signal indicating monophonic reception on lead 136. As previously described, flip-flop 180 operates in conjunction with diode 230 to hold the input to transistor 234 at a low condition until the completion of the pilot signal detection cycle time as indicated by timing signal T3.

Figure 7:
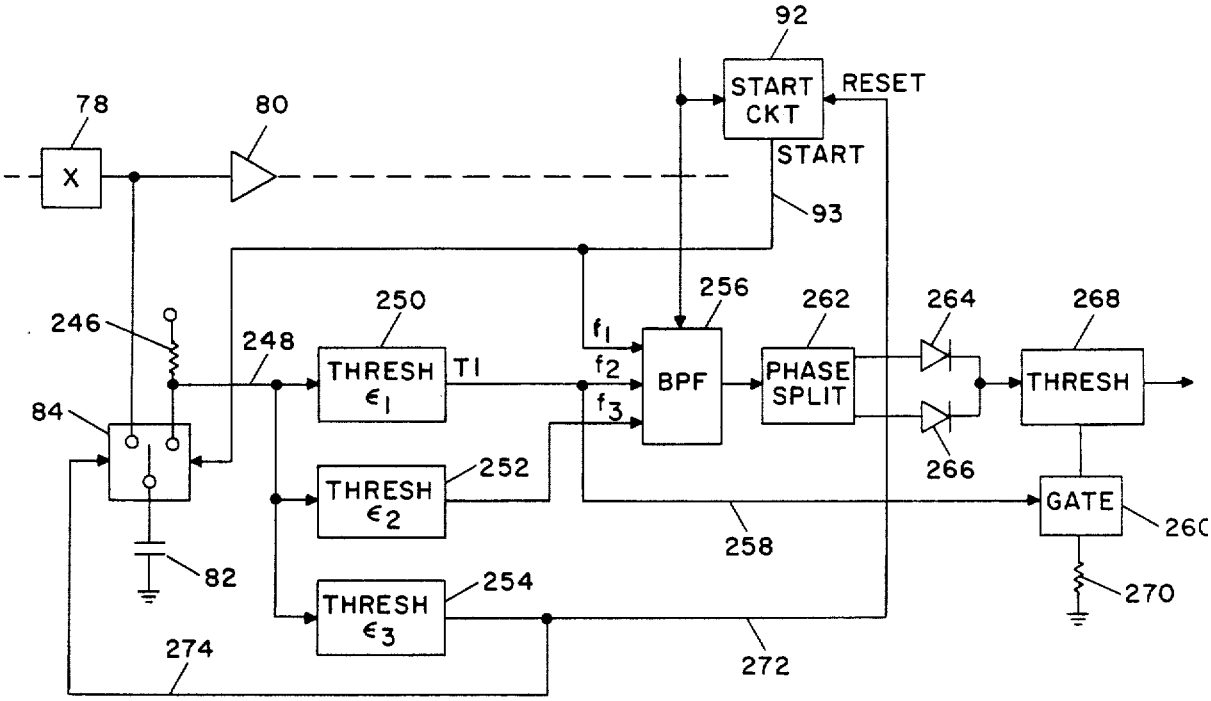
FIG. 7 is a partially schematic and partially block diagram of a control circuit and pilot signal detector in accordance with the present invention.

As previously mentioned in connection with FIG. 1, capacitor 82, which serves as an IF bypass capacitor for the stereo channel, can also be used in connection with switch 84 to provide timing signals for the operation of pilot signal detector 94 and logic circuit 96. FIG. 7 is a diagram illustrating the operating of this type of timing circuit. Switch 84 has one pole connected to the output of quadrature detector 78 and another pole connected through resistor 246 to a positive voltage supply. The output of switch 84 is connected to bypass capacitor 82. During normal stereo reception, switch 84 is in the left position and connects bypass capacitor 82 to the output of quadrature detector 78 for IF bypass. When start circuit 92 indicates a sudden change in the output from the discriminator 54 and integrator circuit 60, 62, a start signal is provided to switch 84 on lead 93, which operates the switch so as to couple capacitor 82 to resistor 246 and the positive voltage supply. This connection to resistor 246 applied a ramp voltage to lead 248 which is supplied to threshold circuits 250, 252 and 254. The start signal is also applied to tunable bandpass filter 256 at the input designated f1 to reset the bandpass filter to the first frequency band to be sampled. When the voltage ramp on lead 248 reaches a first threshold condition designated (e1), threshold circuit 250 is triggered providing an output (T1) to a bandpass filter 256 to change the filter center frequency to (f2) corresponding to a second pilot signal frequency. The signal is also provided over lead 258 to gate 260 which connects resistor 270 into threshold circuit 268, to lower the threshold thereof. For example, in a system for detecting the 5 Hz., 15 Hz. and 25 Hz. pilot signals it is appropriate to lower the threshold value, thereby increasing the threshold circuits sensitivity, for reception of the weaker 15 Hz. and 25 Hz. pilot signals. At some later time, the voltage ramp on lead 248 reaches the second threshold (e2), triggering threshold circuit 252 which provides an output (T2) which changes bandpass filter 256 to the third frequency designated (f3). At still a later point in time, the voltage on lead 248 reaches a value (e3) triggering threshold circuit 254 which provides an output (T3), which causes switch 84 to revert to the IF bypass condition for the detection of stereo difference signals in the ISB channel, and also provides a reset for start circuit 92. An appropriate value for the timing, determined by the voltage ramp on lead 248, is approximately 300 milli-seconds from the occurrence of the start signal to the output of the (T1) signal, another 300 milliseconds to the output of the (T2) signal, and still another 300 milliseconds to the output of the (T3) signal. These time periods should provide an adequate time for the passing of signals through bandpass filter 256, to phase splitter 262, diode detectors 264 and 266, and threshold circuit 268.

As has been previously described, following the output of the (T3) signal, in the event that a single stereo pilot signal has been correctly identified, the stereo indicator signal will reset the operation of start circuit 92. If, however, a stereo pilot signal has not been correctly identified, start circuit 92 may be caused to restart the search cycle for stereo pilot signals. Alternatively, only one or a selected number of search cycles can be made, and the receiver operated in the monophonic mode if a pilot signal has not been detected. The receiver can be left in the monophonic mode until returned to another AM station, or until turned off, or until some selected period of time has elapsed after which another search cycle can be initiated. This is simply a matter of choice for the designer of a specific receiver, and its implementation will be obvious to those skilled in the art in light of the disclosure set forth herein.

In various examples set forth above, there have been described specific embodiments for practicing the present invention by use of both analog ramp voltages and digital timing signals. Those skilled in the art will recognize that these signal formats can be used in varying embodiments of the present invention, and they are presented for example only, and not by way of limitation. Likewise, those skilled in the art will recognize that the specific logic circuits, such as described in FIGS. 5 and 6 are given as examples only and may be replaced with integrated circuits or other logic elements which perform equivalent functions.

It will also be recognized by those skilled in the art, that the preferred embodiments of the receiver shown in solid lines in FIG. 1, which is capable of receiving AM/PM stereo signals, CQUAM stereo signals, and ISB stereo signals, may be arranged to receive any two or more of the five different proposed AM stereo signals described herein, and such modifications and variations are deemed to be within the scope of the present invention as set forth in claims.

While there have been described what are believed to be the preferred embodiments of the invention, those skilled in the art will recognize that other and further modifications may be made thereto without departing from the spirit of the invention, and it is intended to claim all such changes and modifications as fall within the true scope of the invention.

I claim:

1. In a receiver for stereophonic broadcast signals which include a modulation component comprising a pilot signal having a selected frequency characteristics, apparatus for determining the presence or absence of said pilot signal, comprising:

means for detecting received signal components which lie within a first band of frequencies which includes said pilot signal, and for also detecting received signal components which lie within at least one other band of frequencies located above or below said first band;

and means for evaluating the signals detected in said first and other bands, and for developing [an] *a binary* output signal which indicates when signals in said first band exceed a first level and signals in said other band do not exceed a second level.

2. Apparatus in accordance with claim 1 wherein said detecting means detects received signal components lying within second and third other frequency bands which are above and below, respectively, said first frequency band and adjacent thereto.

3. Apparatus in accordance with claim 2 wherein said pilot signal has a narrowband frequency characteristic and wherein *said* first, second and third frequency bands are correspondingly narrow.

4. Apparatus in accordance with claim 3 wherein said pilot signal is a subaudible, substantially signal frequency tone.

5. Apparatus in accordance with claim 4 wherein said evaluating means develops an output signal only when a signal having the characteristics of said pilot signal has been detected in said first band *and* exceeds a first threshold *level* during a selected evaluation period and no signals have been detected in either of said second and third other adjacent bands which exceed [and] and a second threshold *level* during said selected evaluation period.

6. Apparatus in accordance with claim 5 wherein said detecting means *can* simultaneously [detects] *detect* signals in said first, second and third frequency bands.

7. Apparatus in accordance with claim 5 wherein said detecting means *can* sequentially [detects] *detect* signals in said first, second and third frequency bands in a predetermined order.

8. In a receiver for a plurality of different types of AM stereophonic broadcast signals, each of which includes a modulation component comprising a pilot signal having a selected frequency characteristic that is unique to that type of AM stereophonic broadcast signal, apparatus for determining the presence of any one of said pilot signals, thereby indicating which type of AM stereophonic broadcast signal is being received, comprising:

means for detecting received signal components which lie within a plurality of narrow frequency bands, each of which includes only one of said pilot signals;

and means for evaluating the signals detected in each of said frequency bands, and for developing an output signal which indicates when signals in one of said bands exceed a predetermined level and signals in all other bands do not exceed said level and which also indicates which of said plurality of bands said one band is, thereby indicating which type of AM stereophonic broadcast signal is then being received.

9. Apparatus in accordance with claim 8 wherein each of said pilot signals is a subaudible, substantially single frequency tone, wherein said evaluating means has a plurality of outputs, each of which represents a corresponding one of said like plurality of AM stereophonic broadcast signal types, and wherein the output signal from said evaluating means is supplied on one of said plurality of outputs, thereby indicating which type of AM stereophonic broadcast is then being received.

10. Apparatus in accordance with claim 9 wherein said detecting means *can* simultaneously [detects] *detect* signals in said plurality of frequency bands.

11. Apparatus in accordance with claim 9 wherein said detecting means *can* sequentially [detects] *detect* signals in said plurality of frequency bands in a predetermined order.

12. Apparatus in accordance with either claim 10 or claim 11 wherein said apparatus additionally includes means for periodically activating said detecting means and said evaluating means, thereby to make a new evaluation of the signal content of said plurality of frequency bands during each period when said means are activated.

13. A receiver for receiving and demodulating composite amplitude-modulated (AM) stereophonic broadcast signals comprising a carrier having amplitude modulation, representative of stereo sum (L+R) information, and angular modulation, representative of stereo difference (L−R) information, impressed on said carrier according to *either* one of at least two composite modulation techniques, said angular modulation further including a pilot signal component having a selected frequency characteristic representative of said one composite modulation technique, comprising:

means for receiving composite AM stereo signals and for converting said signals to corresponding intermediate frequency (IF) signals;

means for amplitude demodulating said IF signal to derive therefrom a signal representative of said (L+R) information;

angular demodulating means for demodulating said IF signal according to the requirements of said first and second composite modulation techniques to develop corresponding first and second audio frequency output signals representative of (L−R) information transmitted according to said first and second composite modulation techniques, respectively;

means for detecting receiving signal components which lie within a first narrow band of frequencies which include the pilot signal which is representative of said first composite modulation technique, and for also detecting received signal components which lie within a second narrow band of frequencies which include the pilot signal which is representative of said second composite modulation technique;

means for evaluating the signals detected in said first and second bands and for developing one or more output signals which indicate when signals in only one of said frequency bands exceed a predetermined level and in which of said two bands said signals lie;

means, responsive to the output of said evaluating means [and] *or* having said first and second audio output signals supplied thereto, for passing said first or said second signal only when the output of said evaluating means indicates that the corresponding pilot signal is present in the received signal;

and means for utilizing said (L+R) representative signal and the audio signal passed by said last mentioned means for deriving left (L) and right (R) stereo audio output signals.

14. A receiver in accordance with claim 13 wherein [one] *each* of said pilot signals is a subaudible, substantially signal frequency tone, wherein said evaluating means has [a plurality of] *at least two* outputs, each of which represents a corresponding one of said [like plurality of] AM stereophonic [broadcast signal types] *composite modulation techiques*; and wherein the output signal from said evaluating means is supplied on one of said [plurality of] outputs, thereby indicating which type of AM stereophonic broadcast is then being received.

15. A receiver in accordance with claim 14, wherein said detecting means *can* simultaneously [detects] *detect* signals in said [plurality of] *first and second* frequency bands.

16. A receiver in accordance with claim 14, wherein said detecting means *can* sequentially [detects] *detect* signals in said [plurality of] *first and second* frequency bands in a predetermined order.

17. A receiver in accordance with claim 15 or 16 wherein said additionally includes means for periodically activating said detecting means, thereby to make a new evaluation of the signal content of said *first* and *second* plurality of frequency bands during each period when said means are activated.

*18. A multiple-system AM stereo receiver for receiving and demodulating composite amplitude-modulated (AM) stereophonic broadcast signals which comprise a carrier having amplitude modulation, representative of stereo sum (L+R) information, and angular modulation, representative of stereo difference information, impressed on said carrier according to either of at least two different composite modulation techniques, said angular modulation further including a pilot signal component having a selected frequency characteristic representative of the particular one of said composite modulation techniques used to develop the broadcast signal, said receiver comprising:*

*means for receiving composite AM stereo radio frequency (RF) signals and for converting said signals to corresponding intermediate frequency (IF) signals;*

*means for detecting the presence of AM stereo pilot signal components in said received signals and determining the frequency characteristic of said pilot signals, and for developing at least one control signal when the presence of a pilot signal is detected, said control signal being indicative of the particular composite modulation technique represented by said pilot signal;*

*decoding means, capable of operating in different modes appropriate for amplitude and angular demodulation of IF signals corresponding to at least two of said different composite modulation techniques, said different modes being selectable in response to said con-*

*trol signal, for appropriately demodulating said IF signal to develop a pair of output signals representative of* $(L+R)$ *and* $(L-R)$ *information, respectively, when said control signal indicates reception of an AM stereo signal corresponding to either one of said composite modulation techniques;*

*and means, responsive to said* $(L+R)$ *and* $(L-R)$ *representative signals, for deriving left* $(L)$ *and right* $(R)$ *stereo audio output signals therefrom.*

* * * * *